United States Patent
Kim et al.

(10) Patent No.: US 9,868,105 B2
(45) Date of Patent: Jan. 16, 2018

(54) SPINEL-TYPE LITHIUM TITANIUM OXIDE/GRAPHENE COMPOSITE AND METHOD OF PREPARING THE SAME

(71) Applicant: INDUSTRY-ACADEMIC COOPERATION FOUNDATION, YONSEI UNIVERSITY, Seoul (KR)

(72) Inventors: Kwang Bum Kim, Gyeonggi-do (KR); Hyun Kyung Kim, Chungcheongbuk-do (KR); Ji Young Kim, Seoul (KR)

(73) Assignee: INDUSTRY-ACADEMIC COOPERATION FOUNDATION, YONSEI UNIVERSITY (KR)

( * ) Notice: Subject to any disclaimer, the term of this patent is extended or adjusted under 35 U.S.C. 154(b) by 163 days.

(21) Appl. No.: 14/836,045

(22) Filed: Aug. 26, 2015

(65) Prior Publication Data

US 2015/0360197 A1 Dec. 17, 2015

Related U.S. Application Data

(63) Continuation of application No. 13/270,132, filed on Oct. 10, 2011, now abandoned.

(30) Foreign Application Priority Data

Oct. 29, 2010 (KR) ........................ 10-2010-0106929

(51) Int. Cl.
*B01J 19/12* (2006.01)
*H01M 4/04* (2006.01)
(Continued)

(52) U.S. Cl.
CPC ............. *B01J 19/126* (2013.01); *B82Y 30/00* (2013.01); *B82Y 40/00* (2013.01);
(Continued)

(58) Field of Classification Search
CPC ... C01B 31/0476; C01B 31/0206; H01B 1/02; H01B 1/24; H01B 1/04; H01M 10/052;
(Continued)

(56) References Cited

U.S. PATENT DOCUMENTS

2011/0111299 A1 5/2011 Liu et al.
2011/0111303 A1 5/2011 Kung et al.
(Continued)

FOREIGN PATENT DOCUMENTS

CN 101752560 A 6/2010

OTHER PUBLICATIONS

Moghaddam ("Controlled microwave-assisted synthesis of ZnO nanopowder and its catalytic activity for O-acylation of alcohol and phenol." Mater Sc Eng B, 139, pp. 265-269, pub 2007).*

(Continued)

*Primary Examiner* — Tri V Nguyen
(74) *Attorney, Agent, or Firm* — Swanson & Bratschun, L.L.C.

(57) ABSTRACT

A spinel-type lithium titanium oxide/graphene composite and a method of preparing the same are provided. The method can be useful in simplifying a manufacturing process and shortening a manufacturing time using microwave associated solvothermal reaction and post heat treatment, and the spinel-type lithium titanium oxide/graphene composite may have high electrochemical performances due to its excellent capacity and rate capability and long lifespan, and thus be used as an electrode material of the lithium secondary battery.

14 Claims, 4 Drawing Sheets

(51) Int. Cl.

| | | |
|---|---|---|
| *C01B 31/04* | (2006.01) | |
| *B82Y 30/00* | (2011.01) | |
| *B82Y 40/00* | (2011.01) | |
| *C01G 23/00* | (2006.01) | |
| *H01B 1/18* | (2006.01) | |
| *H01M 4/36* | (2006.01) | |
| *H01M 4/485* | (2010.01) | |
| *H01M 4/587* | (2010.01) | |
| *H01M 10/052* | (2010.01) | |

(52) U.S. Cl.
CPC ........ *C01B 31/0476* (2013.01); *C01G 23/005* (2013.01); *H01B 1/18* (2013.01); *H01M 4/04* (2013.01); *H01M 4/364* (2013.01); *H01M 4/485* (2013.01); *H01M 4/587* (2013.01); *C01P 2002/32* (2013.01); *C01P 2002/72* (2013.01); *C01P 2002/82* (2013.01); *C01P 2004/04* (2013.01); *C01P 2004/64* (2013.01); *C01P 2006/40* (2013.01); *H01M 10/052* (2013.01)

(58) Field of Classification Search
CPC .... H01M 4/587; H01M 4/625; H01M 4/1393; B82Y 30/00; B82Y 40/00; B82Y 99/00
USPC .......... 423/448; 252/502, 506, 507; 429/232
See application file for complete search history.

(56) References Cited

U.S. PATENT DOCUMENTS

| | | |
|---|---|---|
| 2011/0129732 A1 | 6/2011 | Bachrach et al. |
| 2011/0200848 A1 | 8/2011 | Chiang et al. |
| 2012/0064409 A1 | 3/2012 | Zhamu et al. |
| 2012/0077080 A1 | 3/2012 | Liu et al. |
| 2013/0022873 A1 | 1/2013 | Von Bulow et al. |

OTHER PUBLICATIONS

Hyun-Kyung Kim et al., "Li4Ti5012/reduced graphite oxide nano-hybrid material for high rate lithium-ion batteries" Electrochemistry Communications, vol. 12, pp. 1768-1771, Oct. 2010.

Jun Yan et al., "Rapid microwave-assisted synthesis of graphene nanosheet/Co3o4 composite for supercapacitors" Electrochemica Acta, vol. 55, Issue 23, Sep. 2010, abstract.

Dina Fattakhova et al., "Solvothermal synthesis and electrochemical behavior of nanocrystalline cubic Li—Ti-0 oxides with cationic disorder", Solid State Ionics, vol. 176, Issues 23-24, Jul. 2005, abstract.

Kunimitsu Kataoka et al., "A single-crystal study of the electrochemically Li-ion intercalated spinel-type Li4Ti5012", Solid State Ionics, vol. 180, Issues 6-8, May 2009, abstract.

Hyun-Kyung Kim et al., Li4TisOdreduced graphite oxide nano-hybrid material Electrochemistry Communications, vol. 12, Issue 12, Dec. 2010, abstract.

Hyun Kyung Kim et al., "Li4Ti5O12/CNT and Li4Ti5O12/Graphene nanocomposite for Li-ion batteries", 218 ECS Meeting, Oct. 10, 2010.

Zhu et al. (Graphene as a conductive additive to enhance the high-rate capabilities of electrospun Li4Ti5012 for lithium-ion batteries. Electrochimica Acta, 55, pp. 5813-5818, online May 13, 2010).

Prakash et al. ("Solution-Combustion Synthesized Nanocrystalline Li4Ti5012 As High-Rate Performance Li-ion Battery Anode." Chem of Materials, 22, pp. 2857-2863, online Mar. 30, 2010).

\* cited by examiner

SPINEL-TYPE LITHIUM TITANIUM OXIDE/GRAPHENE COMPOSITE AND METHOD OF PREPARING THE SAME

CROSS-REFERENCE TO RELATED APPLICATION

This application is a Continuation of U.S. patent application Ser. No. 13/270,132, filed Oct. 10, 2011, which in turn claims priority to and the benefit of Korean Patent Application No. 2010-0106929, filed Oct. 29, 2010, the disclosure of which is incorporated herein by reference in its entirety.

BACKGROUND

1. Field of the Invention

The present invention relates to a spinel-type lithium titanium oxide ($Li_4Ti_5O_{12}$)/reduced graphite oxide (graphene) composite and a method of preparing the same, and more particularly, to a method of preparing a spinel lithium titanium oxide/graphene composite having excellent electrochemical properties capable of simplifying a manufacturing process and shortening a manufacturing time using microwave associated solvothermal reaction and post heat treatment.

2. Discussion of Related Art

Graphene is a carbon structure composed of a two-dimensional (2-D) nanosheet single layer in which sp2 carbon atoms are formed into a hexagonal honeycomb lattice. Since graphene was separated from graphite using a peeling method developed by the Geim research staff (Great Britain) in 2004, reports on graphene have continued to be published. Graphene has come into the spotlight as a leading new material because it has a very high specific surface area (a theoretical value of 2600 $m^2/g$) with respect to its volume and shows excellent electronic conductivity and physical and chemical stabilities (a typical value of $8\times10^5$ S/cm in an aspect of quantum mechanics).

In particular, graphene serves as an effective template on which a nano-sized transition metal oxide can be deposited due to its high specific surface area, excellent electric conductivity and physical and chemical stabilities. When a nanocomplex is formed with a transition metal, graphene may be used in an unlimited variety of applications such as energy storage materials (a lithium ion secondary battery, a hydrogen storage fuel cell, an electrode of a supercapacitor, etc.), gas sensors, medical engineering microparts, and a highly functional composite in a variety of devices.

However, graphene is not easily peeled even when it is in a solution phase because of the van der Waals's interaction between graphene layers due to the presence of sp2 carbon bonds on a surface of the graphene. Also, graphene is not mainly present as single layer graphene but thick multilayer graphene, and readily re-stacks when it is peeled off. Therefore, when a complex material with a transition metal oxide is synthesized in a solution phase using graphene as a precursor, it is difficult to use a high specific surface area of single layer graphene and to form a uniform complex structure, which serves as a factor preventing the use of the transition metal oxide.

On the other hand, graphite oxide is a material in which a number of oxygen functional groups are introduced into a surface of a graphite layer having a graphite-layered structure obtained by subjecting graphite to strong oxidation. Therefore, graphite oxide may be used as a precursor when graphene is mass-produced using a method such as chemical reduction or thermal peeling. Unlike graphene, graphite oxide may be easily dispersed into single layer graphite oxide or graphene oxide due to numerous oxygen functional groups on a surface of the graphite oxide when the graphite oxide is coated with another solution including a water system and is subjected to ultrasonic treatment. Therefore, when a complex material with a transition metal oxide is synthesized using graphene oxide uniformly dispersed in a solution phase as a precursor, graphene oxide may serve as a template on which a nano-sized transition metal oxide can be uniformly deposited. However, since the various oxygen functional groups introduced into the surface of the graphene oxide through an oxidation process are generated by partial breakup of sp2 bonds of graphene, the electric conductivity may be degraded. Therefore, when a complex with a nano-sized transition metal oxide is formed using graphene oxide, in order to use the excellent electric conductivity of graphene, a subsequent process of removing the oxygen functional groups from the surface of the graphene oxide and recovering the sp2 bonds of the graphene using a reducing agent or a hot treatment process is necessarily required after formation of a complex material with the nano-sized transition metal oxide.

In recent years, $Li_4Ti_5O_{12}$ having a spinel structure has come into the spotlight as an anode material for a lithium ion battery. This is because the anode material is hardly changed in volume during charging/discharging cycles, which allows the lithium ion battery to have a long stable lifespan property (cycling) and avoid reduction of electrolytes in an electrode surface. However, conventional $Li_4Ti_5O_{12}$ having a spinel structure is difficult to manufacture on a nanosized scale due to its limits in manufacturing processes, and shows poor capacity and rate capability as the lithium battery anode material because of its poor conductivity. In addition, since a large amount of time (for example, 24 hours) is required to synthesize $Li_4Ti_5O_{12}$, many problems should be solved in advance for it to be applied to the lithium secondary battery. Accordingly, ways and means to solve the above-mentioned problems are still required.

SUMMARY OF THE INVENTION

The present invention is directed to providing a method capable of manufacturing a lithium titanium oxide/graphene composite without performing a subsequent process of removing oxygen functional groups from a surface of graphene oxide and uniformly forming a transition metal oxide on a surface of graphene within a short period of time when the lithium titanium oxide/graphene composite is synthesized using a graphite oxide precursor.

Also, the present invention is directed to providing an anode material for lithium secondary batteries composed of the lithium titanium oxide/graphene composite to give high capacity and rate capability, and a lithium secondary battery including an electrode composed of the anode material.

One aspect of the present invention provides a method of preparing a transition metal oxide/graphene composite. Here, the method includes:

(a) mixing a transition metal (M1) salt, water and a solution graphite oxide dispersed in a polyol solvent;

(b) preparing a transition metal (M1) oxide/graphene composite by applying microwaves to the mixed solution; and (c) preparing a transition metal (M1M2) oxide/graphene composite by applying microwaves to a solution obtained by mixing the transition metal (M1) oxide/graphene composite with a transition metal (M2) salt, Here, the M1 and M2 are the same as or different from each other, represent lithium, ruthenium, nickel, vanadium, cobalt, manganese, iron, or titanium.

Another aspect of the present invention provides a lithium titanium oxide ($Li_4Ti_5O_{12}$)/graphene composite having a spinel structure, including:

a graphene; and a lithium titanium oxide ($Li_4Ti_5O_{12}$) having a nano-sized spinel structure stacked on a surface of the graphene.

Still another aspect of the present invention provides an anode material for lithium secondary batteries including a lithium titanium oxide ($Li_4Ti_5O_{12}$)/graphene composite having a spinel structure according to one exemplary embodiment of the present invention.

Yet another aspect of the present invention provides a lithium secondary battery including an electrode formed of the anode material according to one exemplary embodiment of the present invention.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

Figure 1:
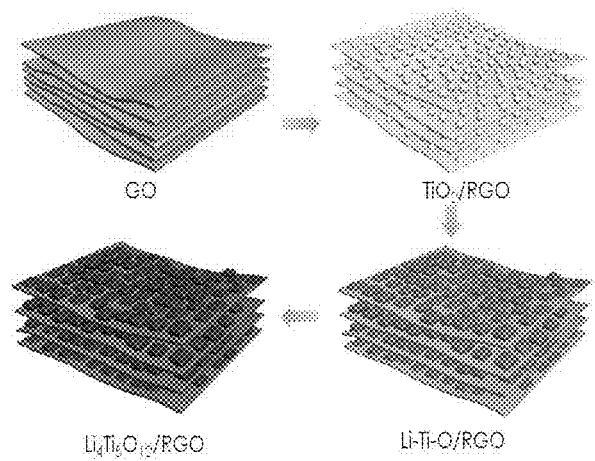
FIG. 1 is a flowchart showing a process of preparing a $Li_4Ti_5O_{12}$/graphene composite having a spinel structure according to one exemplary embodiment of the present invention.

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention.

The terminology used herein is for the purpose of describing particular embodiments only and is not intended to be limiting of exemplary embodiments. The singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, components and/or groups thereof, but do not preclude the presence or addition of one or more other features, integers, steps, operations, elements, components and/or groups thereof.

With reference to the appended drawings, exemplary embodiments of the present invention will be described in detail below. To aid in understanding the present invention, like numbers refer to like elements throughout the description of the figures, and the description of the same elements will be not reiterated.

Hereinafter, embodiments of the present invention will be described in detail.

The present invention relates to a method of preparing a transition metal oxide/graphene composite. Here, the method includes:

(a) mixing a transition metal (M1) salt, water and solution graphite oxide dispersed in a polyol solvent;

(b) preparing a transition metal (M1) oxide/graphene composite by applying microwaves to the mixed solution; and (c) preparing a transition metal (M1M2) oxide/graphene composite by applying microwaves to a solution obtained by mixing the transition metal (M1) oxide/graphene composite with a transition metal (M2) salt, Here, M1 and M2 are the same as or different from each other, and represent lithium, ruthenium, nickel, vanadium, cobalt, manganese, iron, or titanium.

The method of preparing a transition metal oxide/graphene composite according to the present invention includes a transition metal oxide/graphene composite having a heterogeneous structure in which at least two same or different nano-sized transition metal oxides are formed on a surface of graphene.

The method of preparing a transition metal oxide/graphene composite according to the present invention will be described in detail with reference to FIG. 1, as follows.

In step (a), a graphite oxide powder is dispersed in the presence of a polyol solvent and a transition metal (M1) salt and water are added according to a microwave associated polyol reaction.

Dispersing the graphite oxide powder in the polyol solvent includes adding powdery graphite oxide to a polyol solvent and uniformly dispersing the graphite oxide in the polyol solvent using sonication.

In this case, the graphite oxide powder may be preferably used at a content of 0.001 to 0.5 parts by weight, and more preferably 0.01 to 0.1 parts by weight, based on 100 parts by weight of the polyol solvent. In this case, when the content of the graphite oxide powder is less than 0.001 parts by weight, the electric conductivity may not be expected to improve by addition of graphene to the graphene and transition metal oxide composite after the reaction. When the content of the graphite oxide powder exceeds 0.5 parts by weight, it is difficult to disperse the graphite oxide powder.

The polyol may be used without particular limitation, but examples of the polyol may include ethylene glycol, diethylene glycol, triethylene glycol, or tetraethylene glycol.

The transition metal (M1) salt provided to prepare a metal oxide may include a salt of lithium, ruthenium, nickel, vanadium, cobalt, manganese, iron or titanium, which may be used alone or in combination.

The transition metal salt may be included at a content of 0.01 to 20 parts by weight, based on 1 part by weight of the graphite oxide, since an amount of the transition metal oxide deposited on a surface of the graphene may be controlled according to a content. When the content of the transition metal salt is less than 0.01 parts by weight, a small amount of the synthesized transition metal oxide is loaded into the transition metal oxide/graphene complex material, whereas, when the content of the transition metal salt exceeds 20 parts by weight, it is difficult to disperse the transition metal oxide on the graphene during a synthesis step, and the transition metal oxide may be spontaneously educed in addition to the materials of the transition metal oxide/graphene composite.

In addition, the water may be added after the transition metal salt is completely dissolved, but the present invention is not particularly limited thereto.

The addition of water to a mixed solution of a dispersing solution and a transition metal salt is carried out to synthesize a metal oxide using a forced hydrolysis action without performing an post heat treatment process when the metal oxide is synthesized using a microwave associated polyol reaction.

The water may be included at a content of 5 to 90 parts by weight, based on 100 parts by weight of the mixed solution. When the content of the water is less than 5 parts by weight, the metal oxide is obtained in the form of metal rather than transition metal oxide after the synthesis is completed. When the content of the water exceeds 90 parts by weight, a synthetic efficiency of the obtained transition metal oxide may be low.

In step (b), a transition metal (M1) oxide/graphene composite is prepared by applying microwaves to the mixed solution.

The microwave associated polyol reaction is a heating method using microwaves which have a higher heating rate than a heating method using a reflux device. Therefore, since the microwave associated polyol reaction may be used to uniformly heat the entire solution, a reaction time may be shortened, and final particles may be prepared in a smaller size.

When the graphite oxide powder in the mixed solution is reduced to graphene by means of the applied microwaves using the solvothermal synthesis, the graphite oxide powder is increased to a relatively higher temperature, which causes selective random nucleation and growth of the transition metal oxide on a surface of the graphene. Then, the transition metal salt (M1) in the mixed solution is formed on a surface of the graphene in the form of transition metal (M1) oxide nanoparticles using a solvothermal synthesis process, thereby synthesizing the transition metal (M1) oxide/graphene composite.

That is, the transition metal oxide/graphene composite may be prepared since the synthesis of the transition metal (M1) oxide nanoparticle composite and a reduction reaction of the graphite oxide appear at the same time in this step.

According to one exemplary embodiment, in step (b), the microwaves may have an oscillation frequency having a sufficiently low energy not to decompose a molecular structure of the polyol solvent in the mixed solution.

According to one exemplary embodiment, the transition metal (M1) oxide/graphene composite may be synthesized by reacting the mixed solution under the microwaves having an oscillation frequency of 2.45 to 60 GHz for 10 to 30 minutes. This is because particle shape and size of the transition metal (M1) oxide may be easily controlled.

According to one exemplary embodiment, in step (b), the transition metal (M1) salt of step (a) may be titanium salt, and a $TiO_2$/graphene composite may be formed by applying microwaves to a mixed solution including the titanium salt to form titanium oxide nanoparticles on a surface of the graphene.

The titanium oxide nanoparticles are formed in an anatase structure, and have particle sizes of 2 to 10 nm, and more particularly, particle sizes of 3 to 5 nm Also, when the reaction is completed, the transition metal (M1) oxide/graphene composite may be further washed and dried. The washing and drying processes are performed to remove a residual solvent or organic compounds that may be additionally formed in the mixed solution prepared in the previous step.

The washing solvent that may be used herein includes, but is not particularly limited to, alcohol, distilled water, or a mixed solvent thereof.

Also, the washed transition metal (M1) oxide/graphene composite may be dried at a temperature condition of room temperature to 70° C., and a drying process may be used without particular limitation, but the drying may be performed using a conventional drying process.

In step (c), a transition metal (M2) salt is mixed with the transition metal (M1) oxide/graphene composite synthesized in step (b). Then, the transition metal (M2) salt is bound to a surface of the transition metal (M1) oxide, by applying microwaves to the mixed solution, to prepare a composite in which particles of the nano-sized transition metal (M1M2) oxide are formed on a surface of the graphene.

The transition metal (M2) salt provided to prepare a metal oxide may include a salt of lithium, ruthenium, nickel, vanadium, cobalt, manganese, iron or titanium, which may be used alone or in combination.

The transition metal salt may be included at a content of 0.01 to 20 parts by weight, based on 1 part by weight of the graphite oxide, since an amount of the transition metal oxide deposited on a surface of the graphene may be controlled according to a content. When the content of the transition metal salt is less than 0.01 parts by weight, a small amount of the synthesized transition metal oxide is loaded into the transition metal oxide/graphene complex material, whereas, when the content of the transition metal salt exceeds 20 parts by weight, it is difficult to disperse the transition metal oxide on the graphene during a synthesis step, and the transition metal oxide may be spontaneously educed in addition to the materials of the transition metal oxide/graphene composite.

According to one exemplary embodiment, in step (c), a composite in which particles of the nano-sized transition metal (M1M2) oxide are formed on a surface of the graphene may be prepared by applying microwaves having an oscillation frequency of 2.45 to 60 GHz to the mixed solution for 10 to 30 minutes.

According to one exemplary embodiment, in step (c), the transition metal (M2) salt is lithium salt, and a $Li_4Ti_5O_{12}$/graphene composite may be formed by applying microwaves to a mixed solution containing the lithium salt to form lithium titanium oxide nanoparticles on a surface of the graphene.

The lithium titanium oxide nanoparticles may have particle sizes of 5 to 30 nm, and more particularly, particle sizes of 10 to 20 nm In step (c), the transition metal (M1M2) oxide/graphene composite may be further subjected to heat treatment in an argon atmosphere containing hydrogen.

The heat treatment may be performed in a temperature range in which the transition metal (M1M2) oxide can be structurally changed into a transition metal (M1M2) oxide having a spinel structure without decomposing a nanostructure of the transition metal (M1M2) oxide.

According to one exemplary embodiment, the heat treatment may be performed at a temperature range of approximately 500 to 900° C.

According to one exemplary embodiment, the transition metal (M1M2) oxide having a spinel structure may be lithium titanium oxide ($Li_4Ti_5O_{12}$).

Also, the present invention relates to a lithium titanium oxide ($Li_4Ti_5O_{12}$)/graphene composite having a spinel structure, including:

graphene; and lithium titanium oxide ($Li_4Ti_5O_{12}$) having a nano-sized spinel structure stacked on a surface of the graphene.

According to another aspect of the present invention, a composite of graphene and lithium titanium oxide ($Li_4Ti_5O_{12}$) having a spinel structure is provided. Here, since the lithium titanium oxide having a spinel structure is stacked on a surface of the graphene in the form of nano-sized particles, the transition metal oxide has a maximized surface area since the transition metal oxide is very small and uniform in particle size. Therefore, the transition metal oxide may show high-rate charging/discharging capacity and a lifespan property.

According to one exemplary embodiment, the lithium titanium oxide having a spinel structure may have a particle size of 5 to 30 nm, and more particularly, a particle size of 10 to 20 nm Also, the present invention relates to an anode material for lithium secondary batteries including the lithium titanium oxide ($Li_4Ti_5O_{12}$)/graphene composite having a spinel structure.

The anode material may have a capacity at a 100 C rate of 101 mAh/g or more.

According to one exemplary embodiment, the anode material may have an initial discharging capacity of 98% or more after the 100 discharging cycles at a 1 C rate, and a discharging capacity of 97% or more after the 100 discharging cycles at a 10 C rate.

Furthermore, the present invention relates to a lithium secondary battery including an electrode formed of the anode material.

The lithium titanium oxide ($Li_4Ti_5O_{12}$)/graphene composite having a spinel structure according to the present invention may be used as an anode for lithium ion batteries since it has a high rate capability. Also, the anode made of the composite shows excellent rate capability and structural reversibility at a high C rate. Such an excellent property is derived from a short diffusion distance of lithium titanium oxide ($Li_4Ti_5O_{12}$) nanoplatelets uniformly dispersed on the reduced graphene having high conductivity, a high interfacial area between the composite and an electrolyte solution, a 3-D nanopore structure of the nanocomposite, and excellent electric conductivity of a reduced graphite oxide matrix.

Therefore, the electrode composed of the anode made of the lithium titanium oxide ($Li_4Ti_5O_{12}$)/graphene composite according to the present invention may be used for lithium secondary batteries since the electrode has excellent charging/discharging rate and lifespan properties.

Hereinafter, the present invention will be described in detail with reference to Examples thereof. However, it should be understood that the Examples are not intended to limit the scope of the present invention.

Example 1: Preparation of $Li_4Ti_5O_{12}$/Reducted Graphite Oxide Nanocomposite A spinel-type $Li_4T_5O_{12}$ nanoplatelet/reduced graphite oxide (RGO) nanocomposite was synthesized using a two-step microwave associated solvothermal reaction and post heat treatment.

First, the $TiO_2$/RGO nanocomposite was synthesized from graphite oxide (GO) prepared from pure natural graphite powder (SP-1, 200 mesh, Bay Carbon) according to a modified Hummers method. GO powder (0.1 g) was sonicated in diethylene glycol (70 ml) (DEG, >99%, Fluka) for 30 minutes, and titanium ethoxide (0.015 ml) (Aldrich) and distilled water (5 ml) were added to the resulting solution. A 100-ml Teflon vessel was loaded with the mixed solution, and sealed. Then, the resulting mixed solution was placed in a microwave digestion system (MARS-5, CEM Corporation). The reaction mixture was heated to 210° C., and maintained at this temperature for 30 minutes. When the reaction was completed, a resulting powder ($TiO_2$/RGO nanocomposite) was repeatedly washed with ethanol and distilled water. The resulting powder was dried at 70° C. for 24 hours in a vacuum oven.

0.1 g of a Li—Ti—O/RGO nanocomposite was dispersed in 160 ml of an aqueous 0.2M LiOH solution loaded into the 100-ml Teflon vessel under a solvothermal condition caused by the microwaves to synthesize a reaction mixture. The reaction mixture was then heated to 200° C., and maintained at this temperature for 20 minutes. When the reaction was completed, a resulting powder (Li—Ti—O/RGO nano-hybrid) was repeatedly washed with distilled water, and dried at 70° C. for 24 hours in a vacuum oven.

Finally, the Li—Ti—O/RGO nanocomposite was heated at 700° C. for 5 hours in an atmosphere containing 5% by weight of $H_2$/Ar atmosphere.

Characterization

X-ray diffraction (XRD) patterns were collected on a Rigaku D/MAX 2,200 V/PC X-ray diffractometer using Cu Kα radiation (40 kV, 20 mA). The XRD patterns were taken at room temperature in the 2θ range of 10°<2θ<80° at intervals of 0.04°.

TEM images were recorded in a Philips CM200 microscope operated at 200 kV. A sample was dispersed in ethanol, drop-cast onto a carbon-coated microgrid, and dried before the sample analysis.

Raman spectra were measured using a Jobin-Yvon LabRam HR with a liquid $N_2$ cooled CCD multichannel detector at room temperature using a conventional backscattering geometry. An argon-ion laser at a wavelength of 514.5 nm was used as the laser light source. XPS spectra were obtained using a Thermo Electron Corporation ESCA Lab 250 with a chamber pressure maintained below $5 \times 10^{-9}$ mbar during acquisition. A monochromated Al K alpha X-ray source (15 kV; 150 W) irradiated the samples, with a spot diameter of approximately 0.5 mm.

Preparation of Electrode and Electrochemical Measurement

Electrochemical properties were investigated at room temperature using a three-electrode electrochemical cell, with two lithium foils as counter and reference electrodes.

The working electrode consisted of a mixture of 90 wt % $Li_4Ti_5O_{12}$/RGO nano-hybrid and 10 wt % polyvinylidene fluoride dissolved in N-methylpyrrolidone as a binder. The slurry mixture was coated on a titanium foil (99.7% purity, Aldrich) and then dried at 100° C. for 24 h. Each working electrode with a 1×1 cm² area contained 2-3 mg of the dried slurry. The charge-discharge tests and cyclic voltammetry were performed using a potentiostat/galvanostat (VMP2, Princeton Applied Research). The electrolyte was 1 M $LiClO_4$ in propylene carbonate (PC).

FIG. 1 shows a design procedure for preparing a $Li_4Ti_5O_{12}$/RGO nanocomposite. In brief, a GO nanosheet was used as a template having a high surface area to facilitate selective random nucleation and growth of $TiO_2$ nanoparticles. Thereafter, a $TiO_2$/RGO nanocomposite was prepared through solvothermal synthesis caused by microwaves when GO was partially reduced into RGO in a polyol solution while inducing formation of $TiO_2$/RGO. Then, the $TiO_2$/RGO was converted into a $Li_4Ti_5O_{12}$ precursor (referred to as Li—Ti—O)/RGO nanocomposite by a reaction with a LiOH solution under a solvothermal condition caused by the microwaves. Finally, the Li—Ti—O/RGO nanocomposite was subjected to heat treatment at 700° C. for 5 hours in an atmosphere containing 5% by weight of $H_2$/Ar atmosphere to prepare a nanocomposite including a pure phase, a highly crystalline $Li_4Ti_5O_{12}$ nanoplatelet and highly conductive RGO.

In the present invention, because a GO nanosheet can be gradually peeled off from a solution to cause a stable dispersion composed mainly of single layer sheets, the GO nanosheet was selected as a template for precipitation of $TiO_2$ nanoparticles. Also, oxygen functional groups such as hydroxyl, carboxyl and epoxy groups, which strongly interacted with the metal oxide nanoparticles, were present at higher densities than the RGO.

Figure 2:
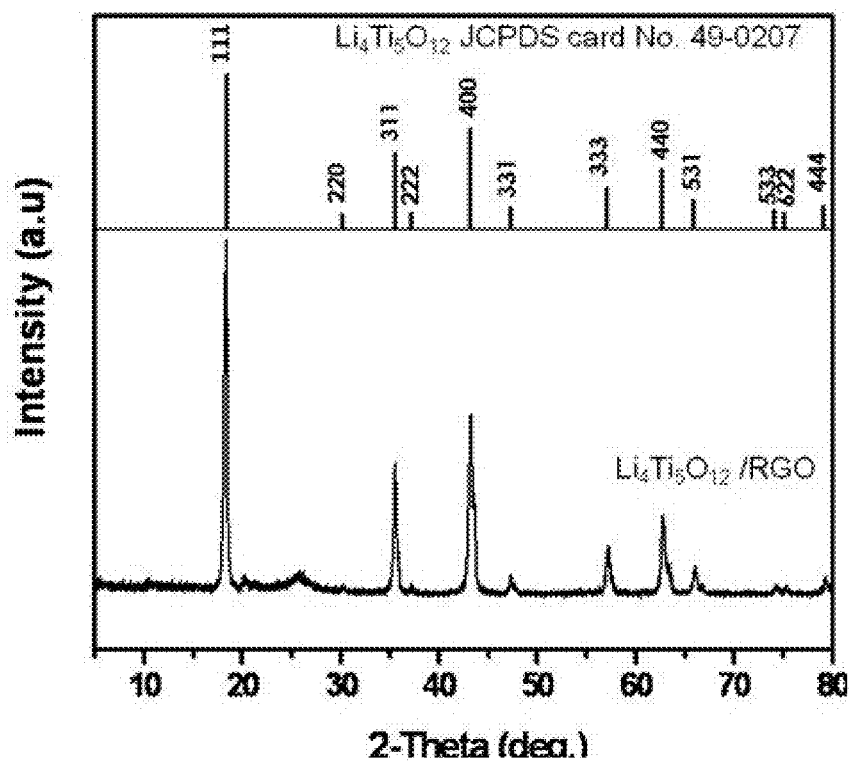
FIG. 2 is a graph showing the X-ray diffraction (XRD) analysis results determining whether lithium titanium oxide is present on the $Li_4Ti_5O_{12}$/graphene composite having a spinel structure prepared according to one exemplary embodiment of the present invention.
Figure 3:
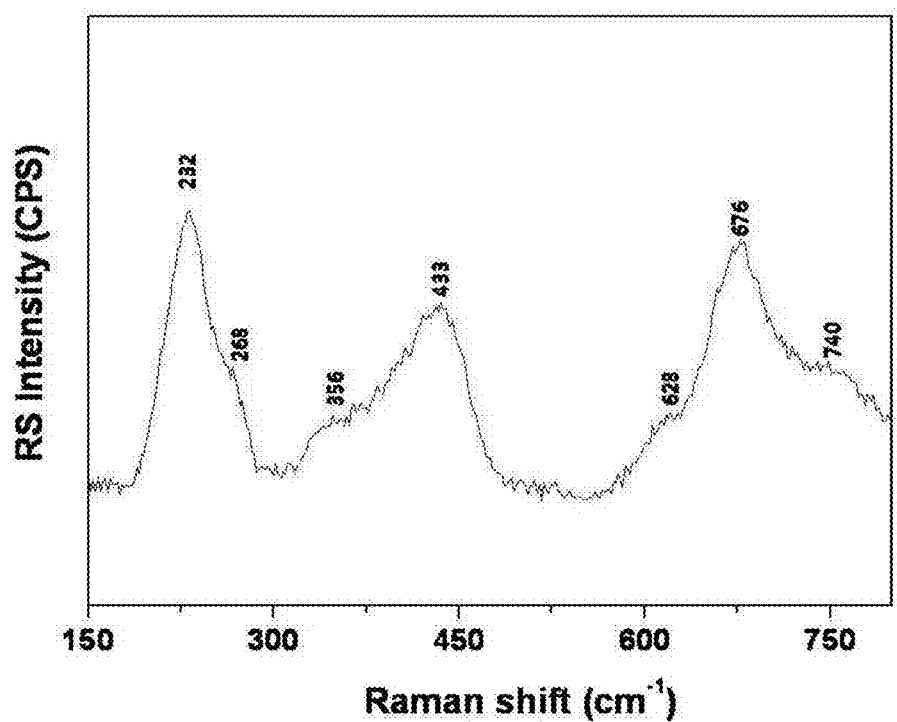
FIG. 3 shows a Raman spectra determining whether lithium titanium oxide is present on the $Li_4Ti_5O_{12}$/graphene composite having a spinel structure prepared according to one exemplary embodiment of the present invention.

FIG. 2 shows XRD patterns of a $Li_4Ti_5O_{12}$/RGO nanocomposite. Here, the XRD patterns represent pure-phase and highly crystalline spinel $Li_4Ti_5O_{12}$. The formation of the pure-phase $Li_4Ti_5O_{12}$ was confirmed using the Raman spectra (FIG. 3). A lattice constant of the spinel $Li_4Ti_5O_{12}$ nanoplatelet was calculated to be 8.364 Å from the XRD data. This corresponds to other reported numerical values.

Figure 4:
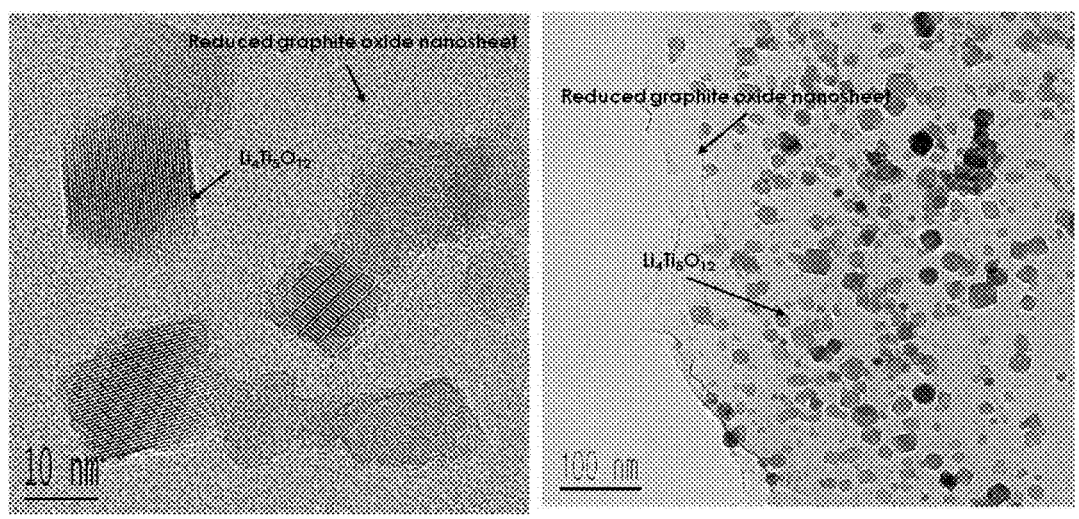
FIG. 4 is a transmission electron microscope (TEM) photographic diagram of the $Li_4Ti_5O_{12}$/graphene composite having a spinel structure prepared according to one exemplary embodiment of the present invention.

FIG. 4 is a TEM photographic diagram showing a $Li_4Ti_5O_{12}$/RGO nanocomposite. Here, it was shown that $Li_4Ti_5O_{12}$ nanoplatelets had sizes of 10 to 20 nm. As shown in FIG. 1, the Li—Ti—O/RGO nanocomposite was formed by subjecting the $TiO_2$/RGO nanocomposite in a LiOH solution to solvothermal treatment using microwaves.

Figure 5:
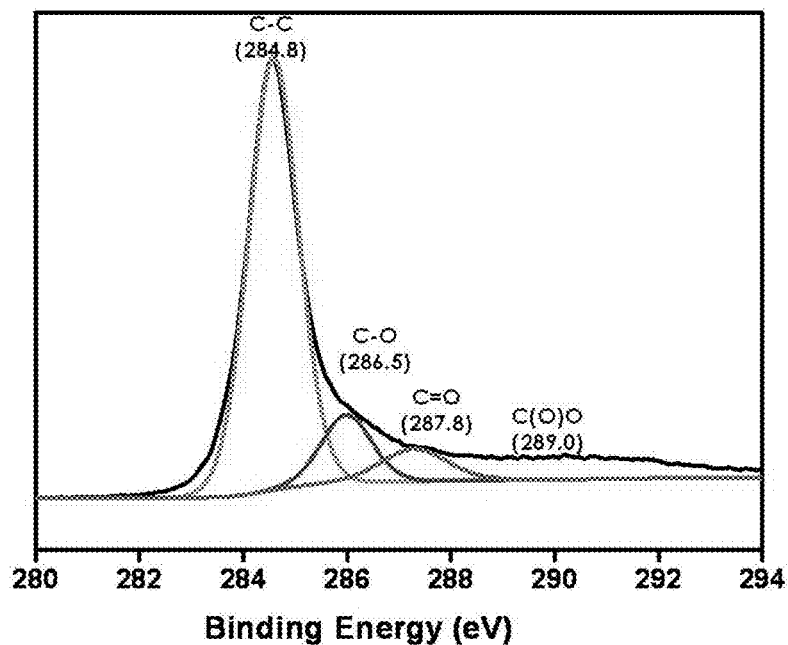
FIG. 5 is X-ray photoelectron spectoscopy (XPS) data analyzing a level of reduction of graphene (C/O ratio) in the $Li_4Ti_5O_{12}$/graphene composite having a spinel structure prepared according to one exemplary embodiment of the present invention.

In addition, in order to realize the high-rate charging/discharging capacity in synthesizing the $Li_4Ti_5O_{12}$/RGO nanocomposite electrode according to the present invention, the electric conductivity of RGO was very important. An important factor to improve the electric conductivity of RGO is to remove residual oxygen introduced during the synthesis of GO. In order to quantify a level of reduction of RGO, an atomic ratio of carbon to oxygen was evaluated using XPS measurement (FIG. 5).

The post heat treatment of the Li—Ti—O/RGO nanocomposite increased a C/O ratio of the RGO from 5.28 to 26.9 with respect to the $Li_4Ti_5O_{12}$/RGO nanocomposite.

When an electrode including the metal oxide nanoparticles was prepared so that the electrode could come in electrical contact between particles and a current collector and between particles, a conductor (15% by weight or more) was also used. In the present invention, an additional conductor was not used for preparation of an electrode including the $Li_4Ti_5O_{12}$/RGO nanocomposite.

Figure 6:
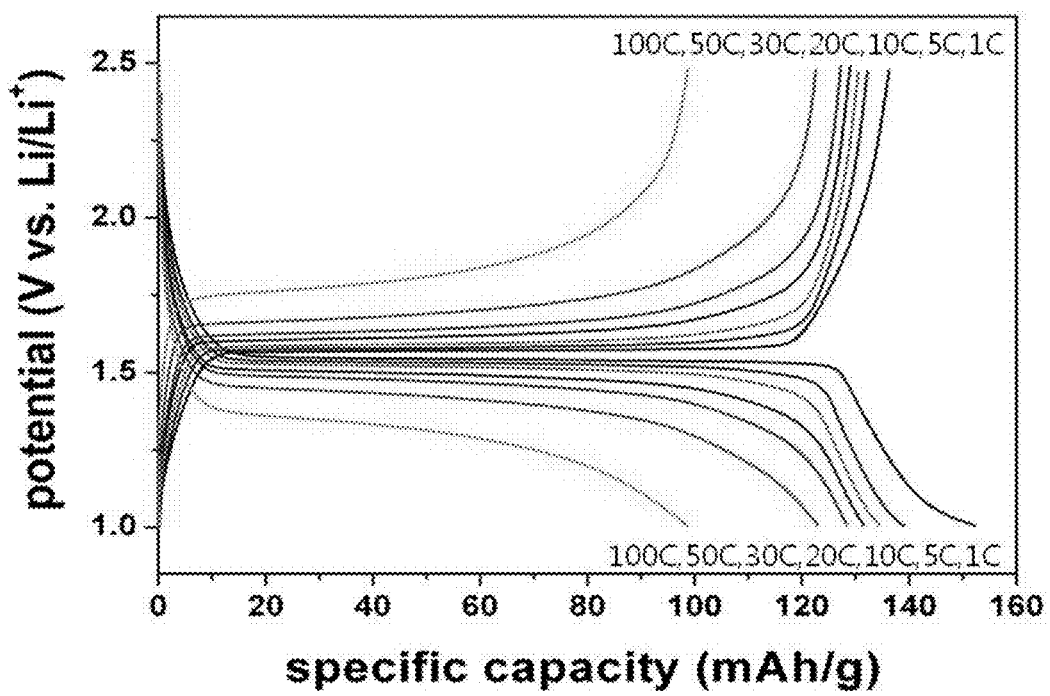
FIG. 6 is a graph showing the capacity of an active material per unit weight of an electrode which is obtained through evaluation of charging/discharging capacity of the $Li_4Ti_5O_{12}$/graphene composite having a spinel structure prepared according to one exemplary embodiment of the present invention.

FIG. 6 show the results from a galvanostatic charging and discharging experiment in which a composite electrode is irradiated with a high rate capability in a 1-2.5 V electric potential window with an increasing C rate from 1 to 100 C. Each set of charging and discharging curves was measured at the same C rate. As a result, typical charging and discharging behaviors of pure-phase spinel $Li_4Ti_5O_{12}$ having an electric potential plateau were seen at 1.571 V (1 C) during a charging cycle and 1.543 V (1 C) during a discharging cycle. The non-discharging capacity of $Li_4Ti_5O_{12}$ in the $Li_4Ti_5O_{12}$/RGO nanocomposite was 154 $mAhg^{-1}$ at a 1 C rate. The $Li_4Ti_5O_{12}$ in the $Li_4Ti_5O_{12}$/RGO nanocomposite could transfer a discharging capacity of 128 $mAhg^{-1}$ at a 50 C rate and a discharging capacity of 101 $mAhg^{-1}$ at a 100 C rate (65% of 1 C discharging capacity) without adding a conductor to the electrode. This explicitly proved the excellent high-rate capability of the $Li_4Ti_5O_{12}$/RGO nanocomposite. The $Li_4Ti_5O_{12}$/RGO nanocomposite had a slightly increased electrode polarity with an increasing C rate from 1 C to 100 C during the charging/discharging cycles, which indicates that the composite has excellent high-rate capability, compared to those already reported.

Figure 7:
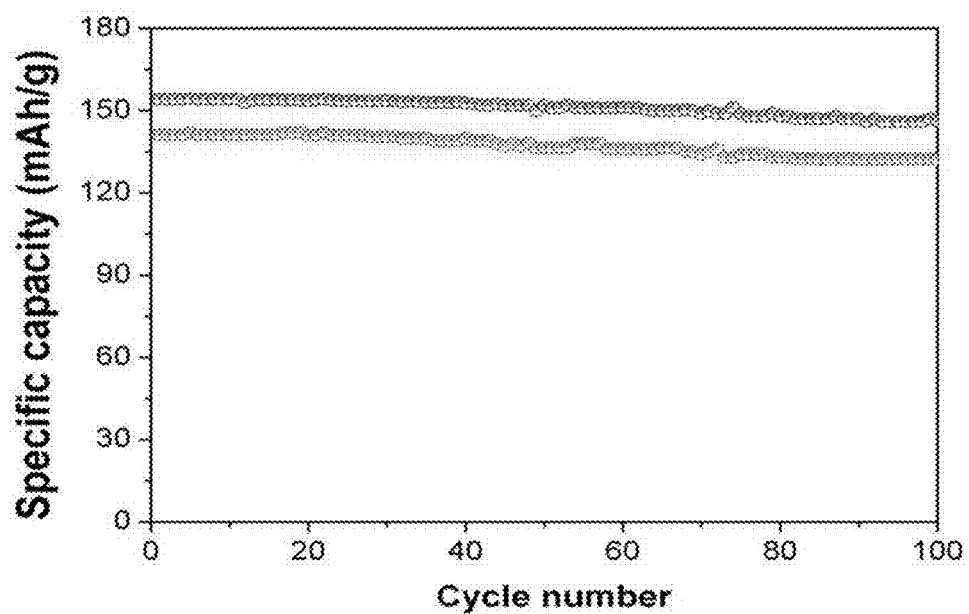
FIG. 7 shows the lifespan property of the $Li_4Ti_5O_{12}$/graphene composite having a spinel structure prepared according to one exemplary embodiment of the present invention.

It is also shown in FIG. 7, that the $Li_4Ti_5O_{12}$/RGO nanocomposite had an excellent discharging capacity of 98% or more after at least 100 discharging cycles at a 1 C rate and 97% or more after at least 100 discharging cycles at a 10 C rate.

According to the present invention, a transition metal oxide can be uniformly formed within a short period of time on a surface of a graphene composite in the form of nanoparticles using microwave associated solvothermal reaction Also, a transition metal oxide/graphene composite prepared according to the method of the present invention can have a maximized surface area since the transition metal oxide is very small and uniform in particle size.

Furthermore, the spinel-type lithium titanium oxide/graphene composite according to the present invention can be used as an electrode material of a lithium secondary battery since it may have a high electrochemical performance due to the excellent capacity and rate capability and long lifespan property.

While the invention has been shown and described with reference to certain exemplary embodiments thereof, it will be understood by those skilled in the art that various changes in form and details may be made therein without departing from the scope of the invention as defined by the appended claims.

What is claimed is:

1. A method of preparing a transition metal oxide/graphene composite comprising:
   (a) mixing a transition metal (M) salt, water and a solution of graphite oxide dispersed in a polyol solvent;
   (b) preparing a transition metal (M1) oxide/graphene composite by applying microwaves to the mixed solution; and
   (c) preparing a transition metal (M1M2) oxide/graphene composite by applying microwaves to a solution obtained by mixing the transition metal (M1) oxide/graphene composite with a transition metal (M2) salt, wherein M1 and M2 are the same as or different from each other, and represent lithium, ruthenium, nickel, vanadium, cobalt, manganese, iron, or titanium.

2. The method of claim 1, wherein, in step (a), a powder of the graphite oxide is dispersed in the polyol solvent using sonication.

3. The method of claim 1, wherein, in step (a), the water is mixed at a content of 5 to 90 parts by weight, based on 100 parts by weight of the mixed solution.

4. The method of claim 1, wherein, in step (b), the microwaves have an oscillation frequency of 2.45 to 60 GHz.

5. The method of claim 1, wherein, in step (b), the transition metal (M1) salt of step (a) is titanium salt, and a $TiO_2$/graphene composite is formed by applying microwaves to a mixed solution containing the titanium salt to form titanium oxide nanoparticles on a surface of the graphene.

6. The method of claim 5, wherein the titanium oxide nanoparticles have particle sizes of 2 to 10 nm.

7. The method of claim 1, further comprising:
washing and drying the transition metal (M1) oxide/graphene composite prepared in step (b).

8. The method of claim 7, wherein the transition metal (M1) oxide/graphene composite is washed with alcohol or distilled water.

9. The method of claim 1, wherein the reaction in step (c) is performed for 10 to 30 minutes under microwaves having an oscillation frequency of 2.45 to 60 GHz.

10. The method of claim 1, wherein, in step (c), the transition metal (M2) salt is lithium salt, and a $Li_4Ti_5O_{12}$/graphene composite is formed by applying microwaves to a mixed solution containing the lithium salt to form lithium titanium oxide nanoparticles on a surface of the graphene.

11. The method of claim 10, wherein the lithium titanium oxide nanoparticles have particle sizes of 5 to 30 nm.

12. The method of claim 1, further comprising:
subjecting the transition metal (M1M2) oxide/graphene composite to heat treatment under an argon atmosphere containing hydrogen.

13. The method of claim 12, wherein the heat treatment is performed in a temperature range in which the transition metal (M1M2) oxide can be structurally changed into a transition metal (M1M2) oxide having a spinel structure without decomposing a nanostructure of the transition metal (M1M2) oxide.

14. The method of claim 13, wherein the heat treatment is performed at 500 to 900° C.

* * * * *